United States Patent
Sternglass et al.

[11] Patent Number: 5,982,613
[45] Date of Patent: Nov. 9, 1999

[54] OPEN-SURFACED RECEPTACLE IN AN ELECTRONIC PRODUCT FOR A REMOVABLE ELECTRONIC MODULE

[75] Inventors: Daniel I. Sternglass, 403 Highgate Rd., Ithaca, N.Y. 14850; Donald F. Grube, Rochester, N.Y.

[73] Assignee: Daniel I. Sternglass, Ithaca, N.Y.

[21] Appl. No.: 08/993,280

[22] Filed: Dec. 18, 1997

[51] Int. Cl.$^6$ ............................... G06F 1/16; H05K 5/00
[52] U.S. Cl. ..................... 361/680; 361/681; 361/686; 361/727; 235/146; 400/82
[58] Field of Search ........................ 361/683, 684, 361/686, 680, 681; 312/223.1, 223.3, 297; 160/202, 211, 216, 197; 396/488; 364/708.1; 235/146; 400/82, 83

[56] References Cited

U.S. PATENT DOCUMENTS

| | | |
|---|---|---|
| D. 254,554 | 3/1980 | Genaro et al. . |
| D. 299,030 | 12/1988 | Menn . |
| D. 322,246 | 12/1991 | Izaki . |
| D. 324,035 | 2/1992 | Izaki . |
| 3,940,758 | 2/1976 | Margolin . |
| 4,564,751 | 1/1986 | Alley et al. ............................. 235/146 |
| 4,654,818 | 3/1987 | Wetterau, Jr. ........................ 364/900 |
| 4,680,455 | 7/1987 | Kuo ....................................... 235/146 |
| 4,739,451 | 4/1988 | Kuba . |
| 4,896,787 | 1/1990 | Delamour et al. . |
| 5,020,090 | 5/1991 | Morris ..................................... 379/58 |
| 5,022,454 | 6/1991 | Kobayashi et al. .................... 160/202 |
| 5,038,531 | 8/1991 | Olewska ................................... 52/64 |
| 5,126,955 | 6/1992 | Tomoda ............................... 364/708 |
| 5,132,876 | 7/1992 | Ma ......................................... 361/394 |
| 5,187,644 | 2/1993 | Crisan . |
| 5,260,884 | 11/1993 | Stern . |
| 5,267,127 | 11/1993 | Pollitt . |
| 5,278,779 | 1/1994 | Conway et al. . |
| 5,287,245 | 2/1994 | Lucente et al. . |
| 5,318,367 | 6/1994 | Braun et al. ............................. 400/82 |
| 5,363,273 | 11/1994 | Ma ......................................... 361/686 |
| 5,416,730 | 5/1995 | Lookofsky ......................... 364/708.01 |
| 5,442,514 | 8/1995 | Hopkins ................................ 361/686 |
| 5,455,746 | 10/1995 | Sato et al. ............................. 361/816 |
| 5,457,453 | 10/1995 | Chiu et al. . |
| 5,481,420 | 1/1996 | Cardona et al. .................... 360/99.06 |
| 5,502,460 | 3/1996 | Bowen .................................. 345/168 |
| 5,519,569 | 5/1996 | Sellers . |
| 5,526,226 | 6/1996 | Katoh et al. . |
| 5,543,790 | 8/1996 | Goldstein . |
| 5,544,005 | 8/1996 | Horikoshi et al. . |
| 5,546,334 | 8/1996 | Hsieh et al. ....................... 364/709.11 |
| 5,559,672 | 9/1996 | Buras, Jr. et al. ..................... 361/684 |
| 5,574,625 | 11/1996 | Ohagami et al. ...................... 361/684 |
| 5,601,489 | 2/1997 | Komaki .................................... 463/44 |
| 5,606,519 | 2/1997 | Viletto ................................ 364/708.1 |
| 5,658,042 | 8/1997 | Ruhringer et al. ..................... 296/216 |
| 5,687,058 | 11/1997 | Roylance .............................. 361/680 |
| 5,687,592 | 11/1997 | Penniman et al. ........................ 70/14 |
| 5,768,163 | 6/1998 | Smith, II ........................... 364/708.01 |
| 5,793,355 | 8/1998 | Youens .................................. 345/457 |
| 5,825,614 | 10/1998 | Kim ...................................... 361/683 |
| 5,852,545 | 10/1998 | Pan-Ratzlaff .......................... 361/683 |
| 5,880,928 | 3/1999 | Ma ........................................ 361/683 |

*Primary Examiner*—Benjamin R. Fuller
*Assistant Examiner*—Jagdish Patel
*Attorney, Agent, or Firm*—Nixon Peabody LLP

[57] ABSTRACT

An electronic product, such as a personal computer or electronic organizer with an open-surfaced receptacle or slot is described. An electronic product incorporating such a receptacle is able to accommodate an insertable electronic module, such as a PCMCIA card, that is thicker than could be incorporated in the receptacle if a portion of the inserted module were not permitted to protrude through the receptacle along the open surface. One embodiment of the invention includes a display, a platform, circuitry, a keyboard, the receptacle, an electrical connector in the receptacle, protective sliding shutters and a door. The platform includes at least two opposing surfaces and at least one side. The inserted card is connected to the circuitry in the platform via the electrical connector located in the receptacle. The keyboard is connected to one of the opposing surfaces and is also coupled to the circuitry. The receptacle has a length, a width and a height and extends into the platform from the side to define an opening in one of the opposing surfaces which extends into the platform along substantially the length and width of the receptacle.

18 Claims, 11 Drawing Sheets

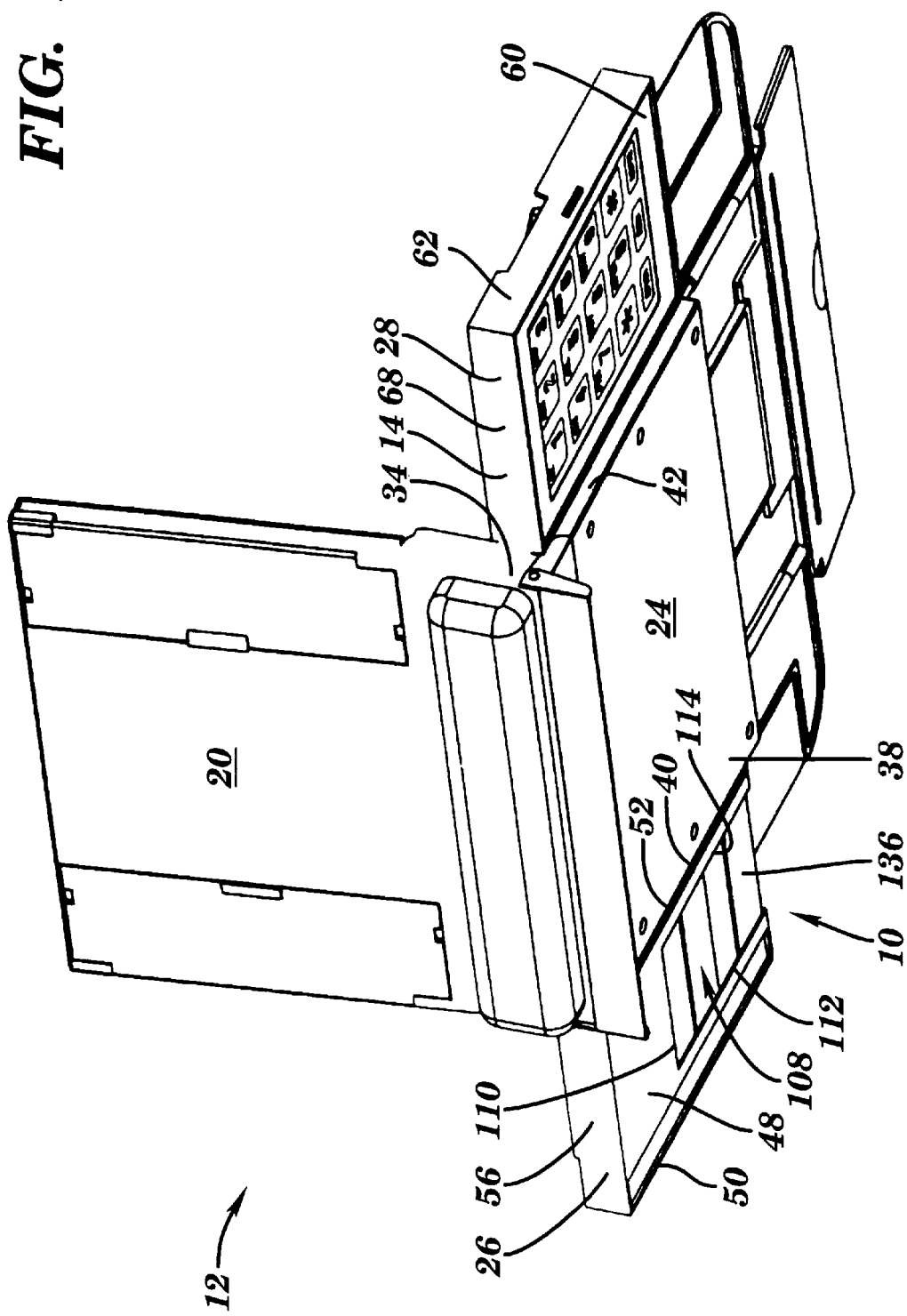

OPEN-SURFACED RECEPTACLE IN AN ELECTRONIC PRODUCT FOR A REMOVABLE ELECTRONIC MODULE

FIELD OF THE INVENTION

This invention relates to an open-surfaced receptacle in an electronic product, such as a personal computer or an electronic organizer, for a removable electronic module or card, which minimizes the overall size of the device during storage or transport. An electronic product incorporating a receptacle in accordance with the present invention is able to accommodate an insertable electronic module, such as a PCMCIA card, that is thicker than could be incorporated in the receptacle if a portion of the inserted module were not permitted to protrude through the receptacle along the open surface.

BACKGROUND

There is a growing demand for the incorporation of receptacles or slots to receive removable electronic modules, such as PCMCIA cards, in applications such as palmtop computers, notebook computers, sub-notebook computers and digital organizers. The receptacles or slots in these applications need to be able to accommodate modules, such as PCMCIA Type I, Type II and Type III cards. In the PCMCIA technical standard, the "Type" designates progressively thicker cards, with Type I being 3.3 mm, Type II 5.5 mm, Type III 10.5 mm. All of these cards share the same nominal length and width dimensions of 86.5 mm×54.0 mm along the base. The cards are designed such that all cards equal to or thinner than the capacity of the slot can be accommodated, e.g. a Type II slot can accommodate a Type I or Type II card, while a Type III slot accommodates a type I, II or III card. Accordingly, the receptacles or slots typically need a height or depth which is at least equal to the size of the largest size electronic card to be accommodated, and these dimensions must be accommodated within the overall size of the electronic device or personal computer.

There is a growing demand to minimize the overall size and cubic volume of many of these devices which accommodate removable modules such as PCMCIA cards, during storage or transport. One technique to accomplish this goal has been to modify the keyboards to have one or more sections which can be folded on to each other to further reduce the overall size of the product during storage and/or transport as illustrated in U.S. Pat. No. 3,940,758 to Margolin, U.S. Pat. No. 5,187,644 to Crisan, U.S. Pat. No. 5,278,779 to Conway et al., U.S. Pat. No. 5,457,453 to Chiu et al., U.S. Pat. No. 5,519,569 to Sellers, U.S. Design Pat. No. 254,554 to Genaro et al., U.S. Design Pat. No. 299,030 to Menn, U.S. Design Pat. No. 322,246 to Izaki, and U.S. Design Pat. No. 324,035 to Izaki which are all herein incorporated by reference. Similar attempts to reduce the overall size of the product by modifying the receptacle or slot have met with limited success.

One prior technique for reducing the overall size of the product is simply to eliminate the receptacle or slot from these applications. However, in view of the growing demand for these receptacles or slots, this is not a desirable solution. Another prior technique, which is widely used, and familiar to those skilled in the art, is to incorporate a "stacked" connector configuration, which can accommodate a single Type III card, or two Type II or Type I cards one on top of the other. The disadvantages to this approach are first, that the volume of the Type III card is always consumed in the product, whether any type III cards are being used or not, and second, that when a Type III card is inserted, it is the only card that can be used because it blocks access to the second slot.

Another solution has been to locate the receptacle or slot in an accessory which is coupled to the product via a connecting cable. With this solution, the overall size of the product is reduced, however the operator of the product must still carry the accessory with the receptacle or slot which can accommodate the largest size electronic card that the user might require, whenever the user wants to use an electronic card. Accordingly, this also is not a desirable solution.

SUMMARY

In accordance with one embodiment of the present invention, an electronic product with an open-surfaced receptacle includes a platform, circuitry, and a receptacle for the removable module. The platform includes at least one surface and at least one side. The circuitry is connected to the platform. The receptacle is designed to receive an electronic card and couple the card to the circuitry. The receptacle has a length, a width, and a depth and extends in from the side of the platform to define an opening in the surface which extends into the platform along substantially the length and width of the receptacle.

In accordance with another embodiment of the present invention, a personal computer with a open-surfaced receptacle includes a display, a platform, circuitry, a keyboard, the receptacle or slot and an electrical connector in the receptacle. The platform includes at least two opposing surfaces and at least one side. The circuitry is connected to the platform. The keyboard is connected to one of the opposing surfaces and is coupled to the circuitry. The receptacle has a length, a width and a height and extends into the platform from the side to define an opening in one of the opposing surfaces which extends into the platform along substantially the length and width of the slot. The electrical connector located in the receptacle is coupled to the circuitry.

The open-surfaced receptacle or slot for an electronic product provides a number of advantages. These include providing an open-surfaced receptacle or slot that can accommodate the largest electronic cards or modules without requiring the receptacle to have a height or depth as large as the largest electronic card or modules. As a result, the overall size of the electronic product is determined by the thickness of a card thinner than the maximum thickness card or module that can be accommodated. Additionally, the open-surface receptacle or slot is able to protect the receptacle from dust and electrostatic damage with a unique interlocking shutter. Further, the open-surfaced receptacle or slot includes an ejector button which can be pivoted down during storage and/or transport to further reduce the overall size of the electronic product.

BRIEF DESCRIPTION OF THE DRAWINGS

FIG. 1A is a perspective view of an open-surfaced receptacle in accordance with one embodiment of the present invention in a personal computer with side sections of a keyboard folded in;

FIG. 1C is a bottom perspective view of the personal computer with the open-surfaced receptacle shown in FIG. 1A with the side sections of a keyboard folded out;

DETAILED DESCRIPTION

Figure 1A:
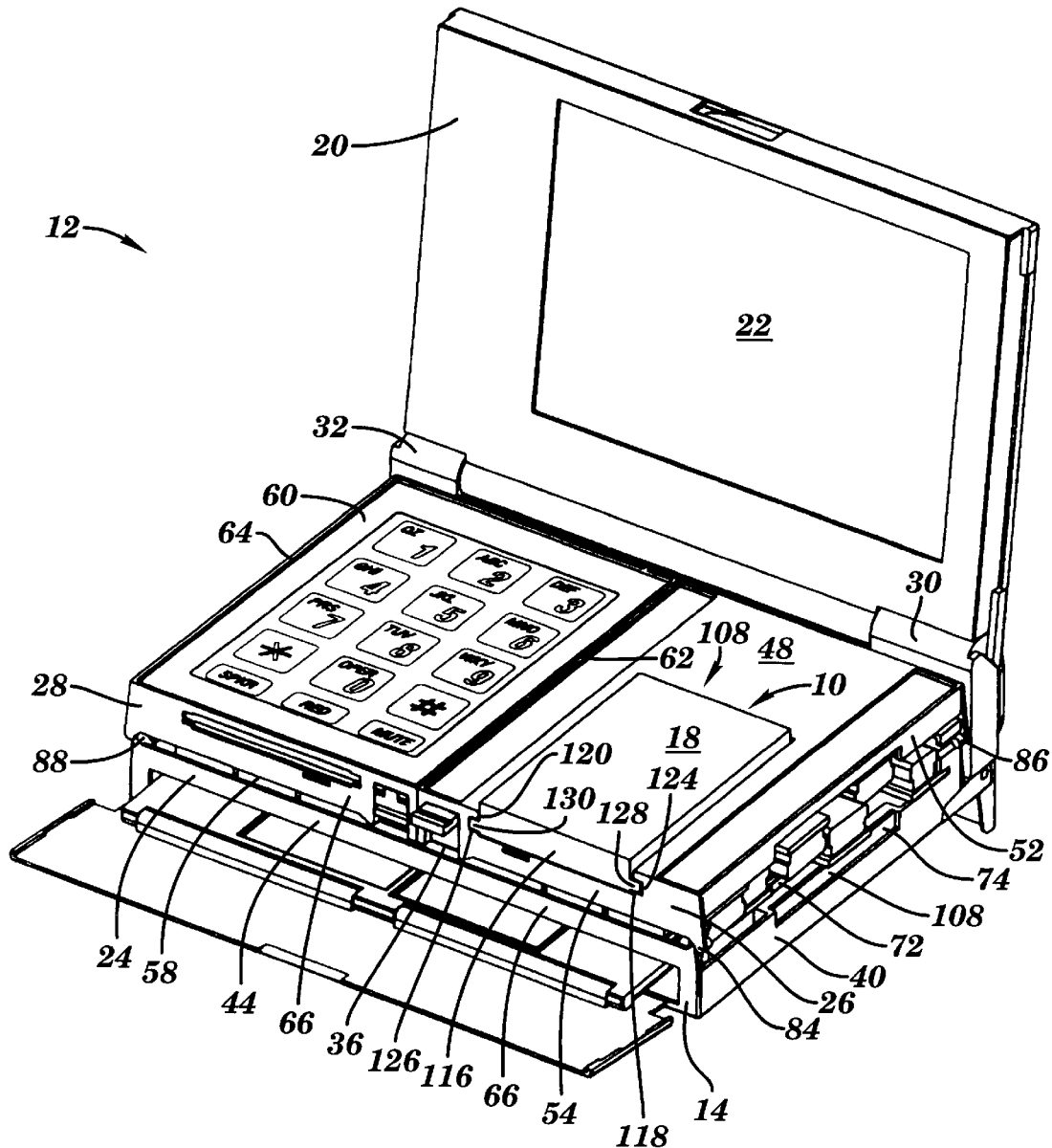

An open-surfaced receptacle 10 or slot in accordance with one embodiment of the present invention in a personal computer 12 is illustrated in FIGS. 1A–1C and FIG. 2. Although the open-surfaced receptacle 10 is shown in a personal computer 12 in this particular embodiment, the receptacle 10 can be used with other electric products, such as electronic organizers, palmtop computers, Personal Digital Assistants (PDAs), mobile phones, remote controls and other such wired or wireless devices incorporating such a receptacle 10. The computer 12 includes a platform 14, circuitry 16, and the open-surfaced receptacle 10 or slot for receiving an electronic card 18. The open-surfaced receptacle 10 provides a number of advantages including the ability to incorporate a receptacle 10 or slot into a personal computer 12 which permits the personal computer 12 to accommodate a thicker card or electric module than it is able to enclose within its own nominal enclosed volume.

Figure 1B:
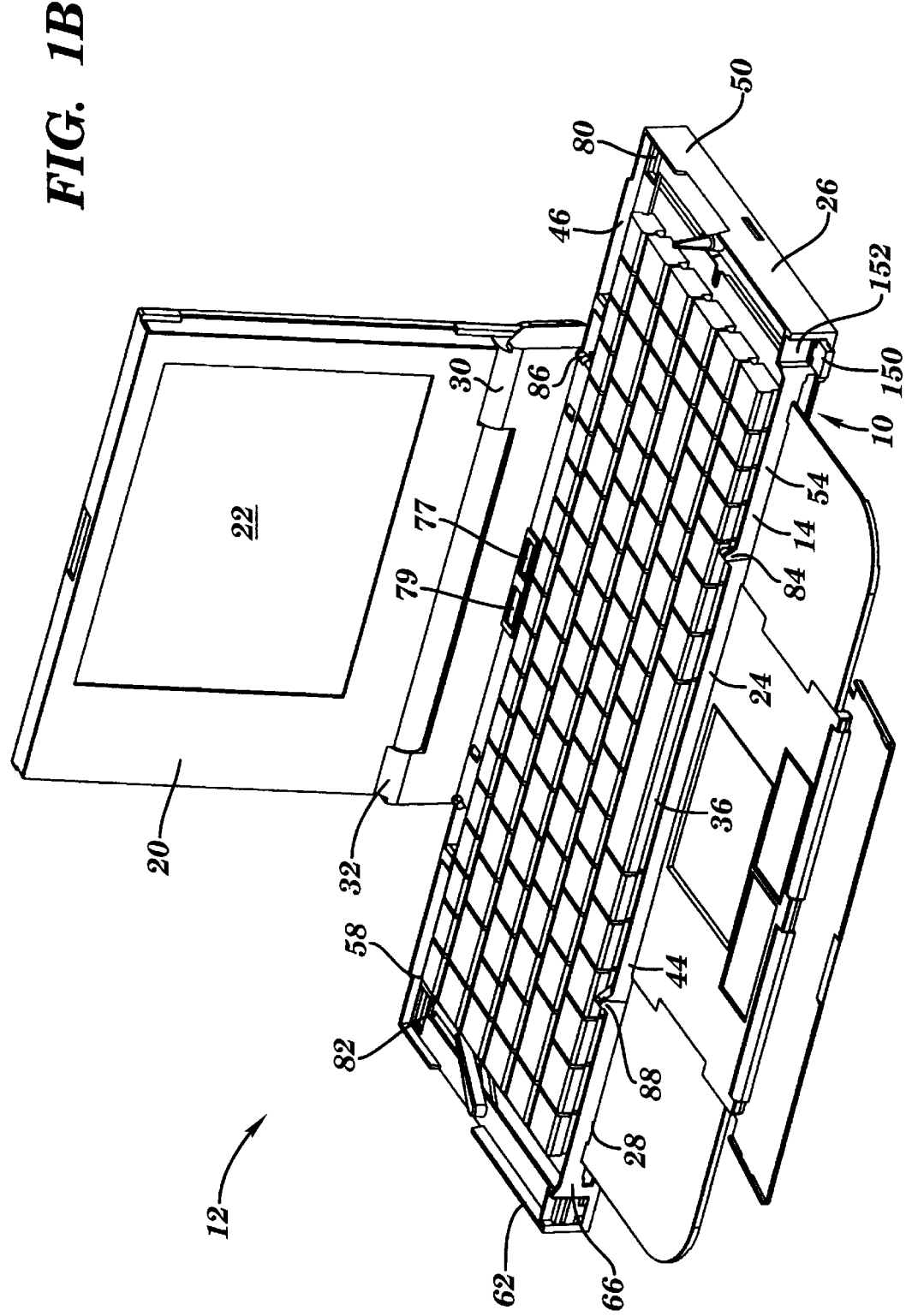
FIG. 1B is a front perspective view of the personal computer with the open-surfaced receptacle shown in FIG. 1A with the side sections of a keyboard folded out.

Referring more specifically to FIGS. 1A–1C, the personal computer 12 is illustrated. In this particular embodiment, the computer 12 comprises a cover 20 with a display 22 built in and the platform 14 with a central section 24, a right section 26 and a left section 28. The cover 20 is pivotally connected by hinge assemblies 30 and 32 to a back surface 34 of the central section 24 and can be moved to a position resting on the central section 24 and to positions pivoted away from the central section 24. The display 22 in the cover 20 is coupled to the circuitry 16 discussed below.

In this particular embodiment, the platform 14 comprises the central section 24 which has a top surface 36, a bottom surface 38, a pair of opposing side surfaces 40 and 42, a front surface 44, and back surface 34. The right section 26 has a top surface 46, a bottom surface 48, a pair of opposing side surfaces 50 and 52, a front surface 54, and a back surface 56. The left section 28, has a top surface 58, a bottom surface 60, a pair of opposing sides surfaces 62 and 64, a front surface 66, and a back surface 68. Although in this example the platform 14 has central, right, and left sections 24, 26, and 28, the platform 14 may have other variations, such as just a central section 24, a central section 24 and a right section 26, a central section 24 and a left section 28, a central section 24 and a front section (not shown), a central section 24 and a back section (not shown); or a central section 24 and front and back sections.

The top surfaces 36, 46, and 58 of the central, right and left sections 24, 26, 28 when folded out contain a plurality of keys 70 which form a standard size keyboard. Each key 70 is normally held in a raised position above the platform 14 by a biasing device (not shown) connected between the platform 14 and each key 70. Each of the key tops is normally held in substantially the same plane. When a key 70 is depressed, the key 70 completes a connection which is coupled to circuitry 16. Although in this particular embodiment, the components on top surfaces 36, 46, and 58 of the central, right and left sections 24, 26, and 28 are keys 70, other types of components, such as microphones and speakers, could be located on the top surfaces 24, 26, and 28 of the central, right, and/or left sections 24, 26, and 28, with or without the keys 70, as needed or desired.

The components on the right and left sections 26 and 28, including the open-surfaced receptacle 10, are coupled to the circuitry 16 in the central section 24. In this particular embodiment, an electrical connector 72, such as a sliding printed circuit board strip with presenting contact areas, on one of the side surfaces 52 for the right section 26 is coupled to components, such as receptacle 10, on the right section 26 and mates with an electrical connector 74, such as a strip of conductive elastomer backed by a printed circuit strip with the same contact pattern as 72, on one of the side surfaces 40 of the central section 24 and is coupled to the circuitry 16 in the central section 24 when the right section 26 is folded open. Similarly, an electrical connector 76, such as a sliding printed circuit board strip with presenting contact, on one of the side surfaces 64 for the left section 28 is coupled to components on the left section 28 and mates with an electrical connector 78, such as a strip of conductive elastomer backed by a printed circuit strip with the same contact pattern as 76, on one of the side surfaces 42 of the central section 24 and is coupled to the circuitry 16 in the central section 24 when the left section 28 is folded open. However, in the example shown, the left side keyboard wing has a keypad affixed to its bottom surface, and does not use the open surfaced receptacle. However, it should be obvious to those skilled in the art that either the left or right or both the left and right sides can implement the open surfaced receptacle. The large number of interconnections obtained using these connectors 72, 74, 76, and 78 make it possible to put the receptacle 10 in right and left sections 26 and 28. Although one type of connection is discussed, other types of connections, such as a flexible connecting cable, mating pin and socket or spring-compression and non-contact types including inductive or Infra-Red or other optical types of connectors could also be used, separately or in combination, to couple components on the right and left sections 26 and 28 to circuitry 16 on the central section 24 regardless of the position of the right and left sections 26 and 28 with respect to the central section 24. This can be seen inasmuch as cards inserted to the slot can operate with the example keyboard in both the open and closed positions.

In this particular embodiment, the central section 24 also includes another pair of electrical connectors 77 and 79 which are located on the top surface 36 of the central section 24 and are coupled to the circuitry 16. The right and left section 26 and 28 also each have electrical connectors 80 and 82 located adjacent the top surface 46 and 58 which are coupled to the components on the right and left sections 26 and 28, respectively. When the right and left sections 26 and 28 are moved to the closed position, the electrical connectors 77 and 79 mate with the electrical connectors 80 and 82 by compressing a conductive elastomer to couple the components, such as receptacle 10, on the right and left sections 26 and 28 to the circuitry 16. Again, although one type of connection is discussed, other types of connections, such as a flexible connecting cable, mating pin and socket or spring-compression types of connectors or non-contact methods previously mentioned could also be used to couple components on the right and left sections 26 and 28 to circuitry 16 on the central section.

As mentioned above, the right and left sections 26 and 28 can each be pivoted between a closed position resting on the central section 24 and an open position providing an extension of the central section 24. In this particular embodiment, this pivoting is accomplished with a pair of hinge assemblies 84 and 86 located at opposing corners of one of the side surfaces 52 of the right section 26 and at opposing corners of one of the side surfaces 40 of the central section 24 and with a pair of hinge assemblies 88 and 90 located at opposing corners of one of the side surfaces 64 of the left section 28 and at opposing corners of one of the side surfaces 42 of the central section 24. Although one type of pivotal connection is illustrated, other types of pivotal connections to pivot the right and left sections 26 and 28 between open and closed positions, such as living hinges can be used as needed or desired.

Figure 2:
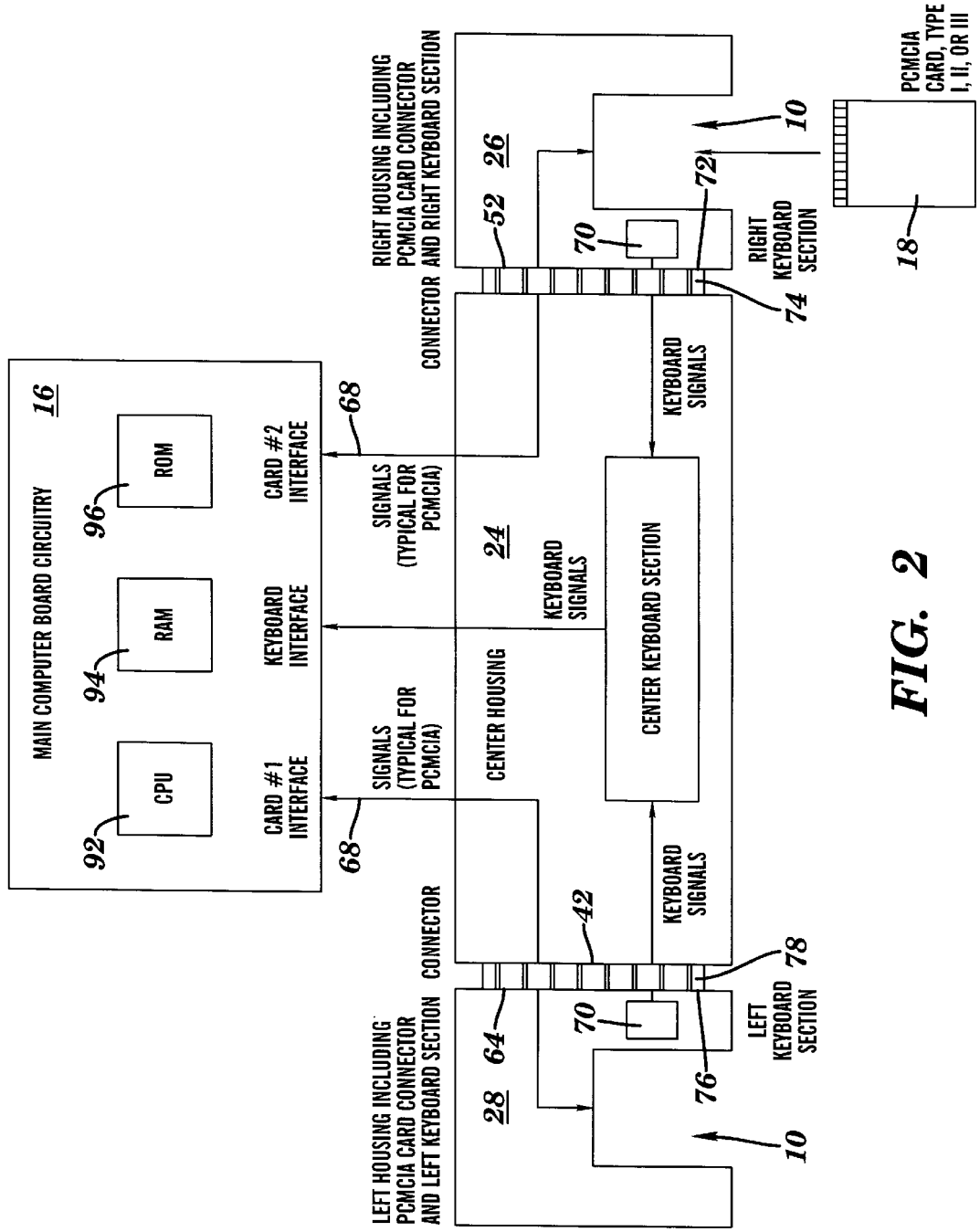
FIG. 2 is a block diagram of the circuitry for the personal computer or other electronic device with the open-surfaced receptacle.

Referring to FIG. 2, a block diagram of the typical circuitry or computer operating components for personal computer or other typical application, the receptacle 10 is seen to couple the plurality of logic and power signals from an insertable card 18 to the appropriate electrical interface on circuit board 16. In this particular embodiment, the connection is made through connector elements 72, 74, 76, and 78, previously described. However, if the card were incorporated in the central section of the device 24, the connector for the removable card may be directly attached to circuit board 16, or connected via a ribbon cable or other conventional method. Note also that multiple receptacles 10 or slots with this open surfaced capability can be implemented in a single computer or product. Typically, circuitry 16 includes components, such as a central processing 92, a Random Access Memory 94, and a Read Only Memory 96, however it is readily apparent that the circuitry will vary with the application. By way of example, U.S. Pat. No. 5,267,127 to Pollitt, herein incorporated by reference, discloses typical circuitry for a personal computer and its operation.

Figure 3A:
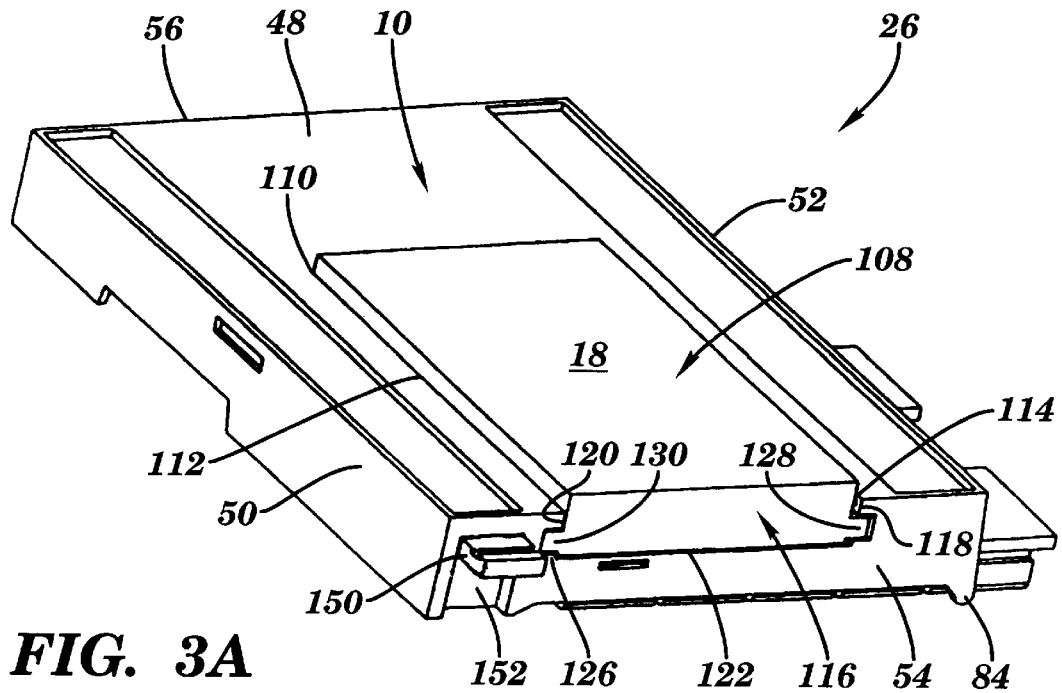
FIG. 3A is a perspective view of the open-surfaced receptacle with an electronic card installed.
Figure 3B:
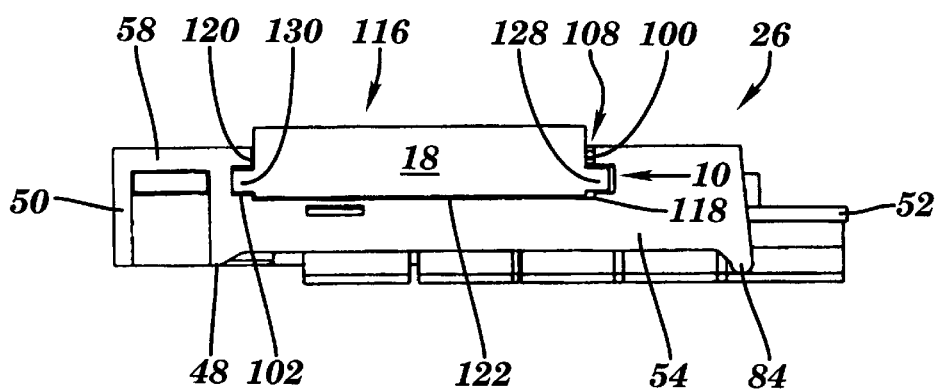
FIG. 3B is a front view of the open-surfaced receptacle with the electronic card installed.
Figure 3C:
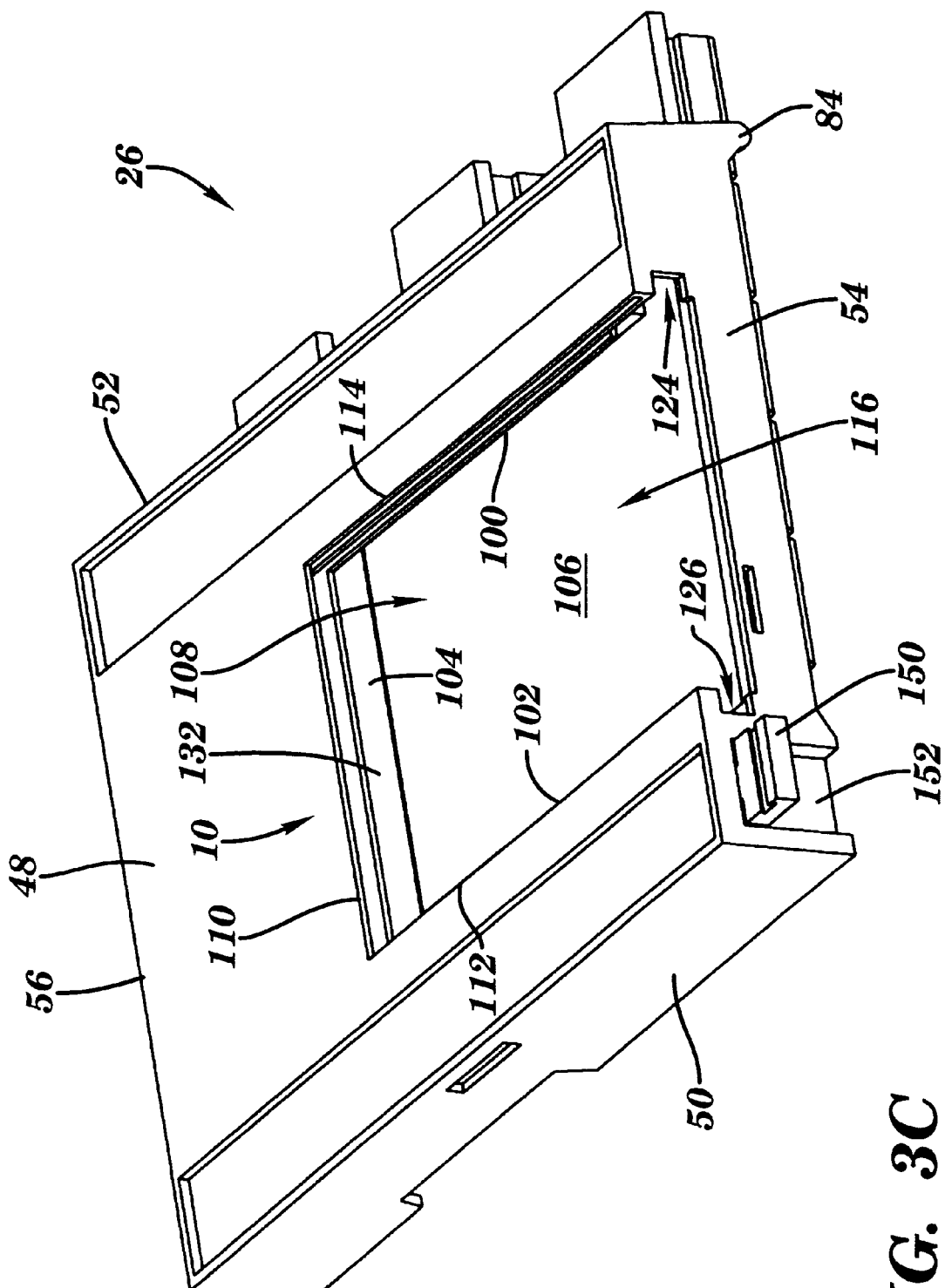
FIG. 3C is a perspective view of the open-surfaced receptacle without the electronic card, shutters or door.

Referring to FIGS. 3A–3C, the open-surfaced receptacle 10 for the personal computer 12 is illustrated. The receptacle 10 comprises a pair of opposing side walls 100 and 102, a back wall 104, and a top wall 106. FIGS. 3A–3C illustrates the right section 26 in the position it would be in when folded in on the central section 24. In this position, the back wall 104 and the side walls 100 and 102 extend down from the bottom surface 48 of the right section 26 to the top wall 106 of the receptacle 10 to form a shallow trough-shaped structure. An opening 108 in the bottom surface 48 of the right section 26 is defined between a bottom edge 110 of the back wall 104 and bottom edges 112 and 114 of the side walls 100 and 102 and extends for substantially the length of the receptacle 10 from front face 54 to back wall 104 of receptacle 10 and for substantially the width of the receptacle 10 between side walls 100 and 102. The opening 108 extends down to the top wall 106 of the receptacle 10. As shown in FIGS. 3A and 3B, when an electronic card 18 is inserted in the receptacle 10 which has a height or depth which is greater than the height or depth of the side walls 100 and 102, the opening 108 permits the electronic card 18 to extend up out of the opening 108 and past the bottom surface 48 of the right section 26.

Another opening 116 is defined in the front surface 54 of the right section 26 between front side edges 118 and 120 of the side walls 100 and 102 and a front edge 122 of the top wall 106. As shown in FIGS. 3B and 3C, track 124 and 126 are defined in side walls 100 and 102 of the receptacle 10. Each track 124 and 126 extends in from the opening 116 in front surface 54 of right section 26 and along the side walls 100 and 102 towards the back wall 104. Side edges 128 and 130 of an electronic card 18, such as a PCMCIA Type I, Type II, or Type III card, are designed to ride along these tracks 124 and 126 when inserted in receptacle 10.

Referring to FIGS. 1A, 1B, 2 and 3A–3C, the back wall 104 of the receptacle 10 includes an electrical connector 132 which is adapted to mate with the back end of an electronic card 18 when inserted. The electrical connector 132 in the back wall 104 is coupled to electrical connector 72 by a flexible cable (not shown) and also to electrical connector 80, although electrical connector 132 could have other connections, such as just to electrical connector 72, just to electrical connector 80, or to a flexible connecting cable (not shown) coupled to circuitry 16, or be mounted directly to circuitry 16 in an embodiment where the card slot were located in the central section 24.

Although in this particular embodiment, opening 108 is in the bottom surface 48 of right section 26 and opening 116 is in the front surface 54 of right section 26, the openings 108 and 116 could be located elsewhere on the platform 14, such on the top, front, back, or side surfaces 46, 54, 56, 50, and 52 as needed or desired. Additionally, even though in this particular embodiment the receptacle 10 is located in the right section 26, the receptacle 10 can be located in other sections, such as the central section 24 or the left section 28 as needed or desired. Also, as noted earlier, although this embodiment only illustrates a single open surfaced receptacle, multiple instances of such a receptacle are possible.

Referring to FIGS. 4A, 4B, 5A, and 5B, a door 134 and a shutter 136 for the open-surfaced receptacle 10 are illustrated. The door 134 is pivotally connected on opposing sides to the opposing side walls 100 and 102 of the receptacle 10 adjacent opening 116. The door 134 is pivotable between a position covering the opening 116 in the front surface 54 of the right section 26 and a position exposing the opening 116 in the front surface 54 of the right section 26. The door 134 protects the receptacle 10 from dust and electrostatic discharge. Although not shown, a biasing device may be used to bias the door 134 to a covered position.

Figure 5A:
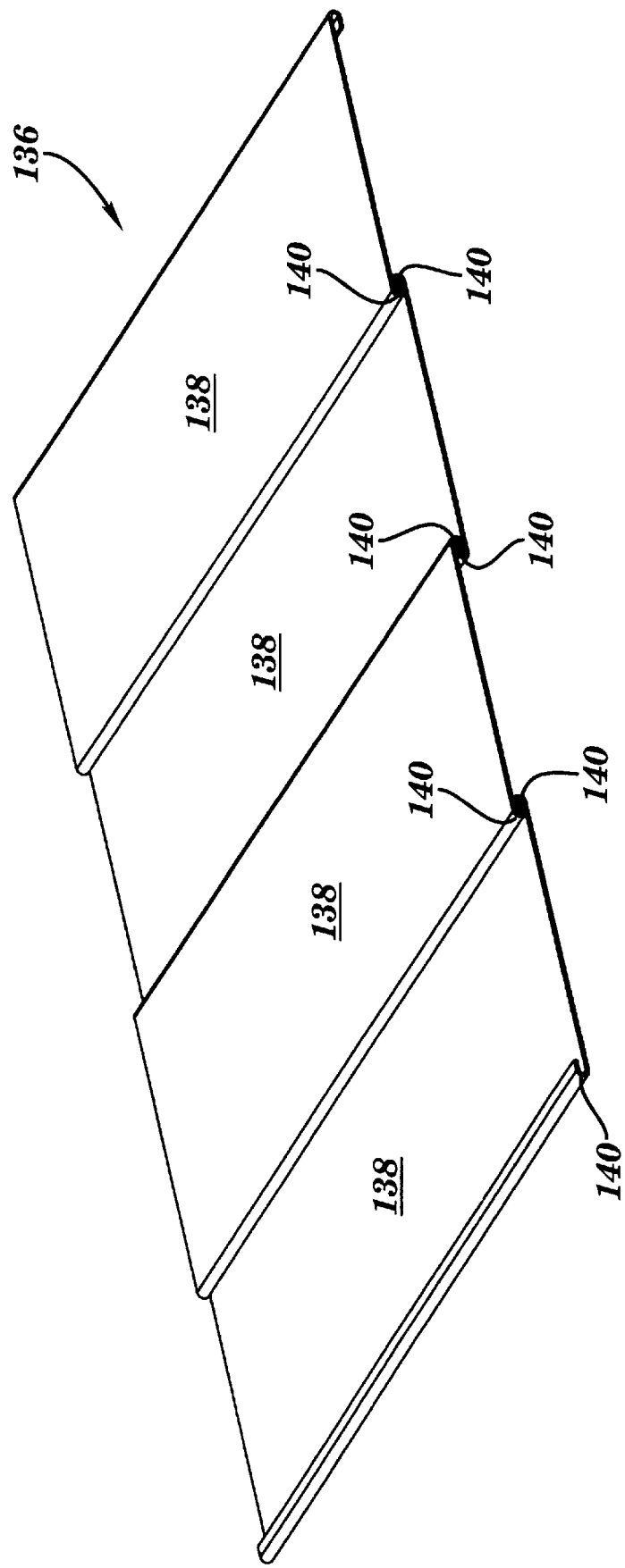
FIG. 5A is a perspective view of one of the shutters.
Figure 5B:
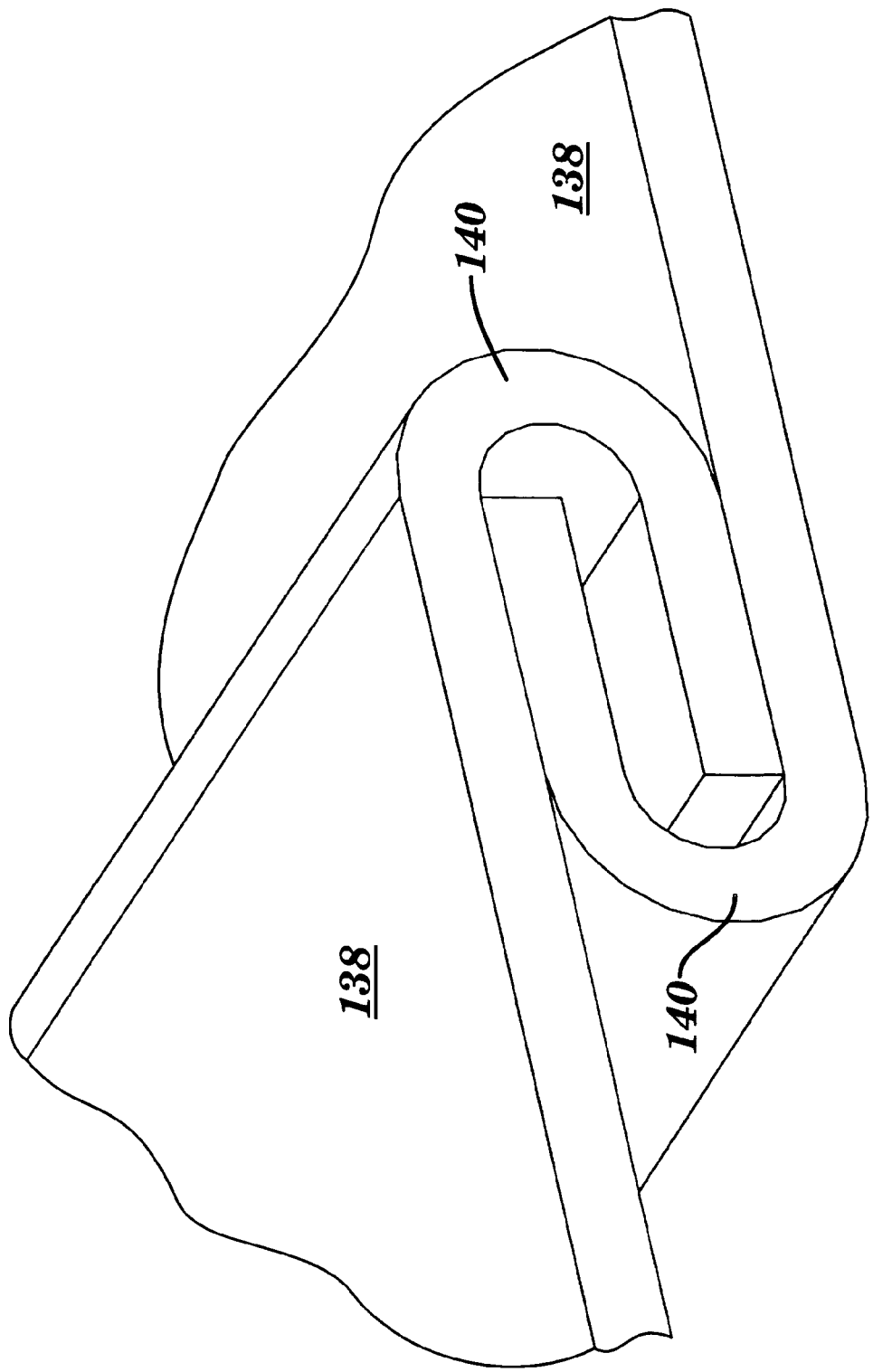
FIG. 5B is an enlarged perspective view of a portion of one shutter.

The shutter 136 extends between opposing side walls 100 and 102 of the receptacle 10 adjacent the bottom edges 112 and 114 of the side walls 100 and 102 and the back wall 104 of the receptacle 10. In this particular embodiment, the shutter 136 comprises a series of detachably interlocking plates 138 which can collapse on top of each other to expose the receptacle 10, although other types of shutters can be used as needed or desired. The front and back edges of each plate 138 have a J-shaped end 40 which interlocks with a J-shaped end 140 of the next plate 138, as shown in FIGS. 5A and 5B. A track 142 and 144 extends along the bottom edge 112 and 114 of each side wall 100 and 102 and side edges of each of these plates 138 ride in the tracks 142 and 144 between a position covering the opening 108 in the bottom surface 48 and a position exposing the opening 108 in the bottom surface 48. In this particular embodiment, leaf springs 146 are connected between the plates 138 of the shutter 136 and bias the shutter 136 to cover the receptacle 10, although other types of biasing devices can be used as needed or desired. The shutter 136 protects the receptacle 10 from dust and electrostatic discharge.

Figure 4A:
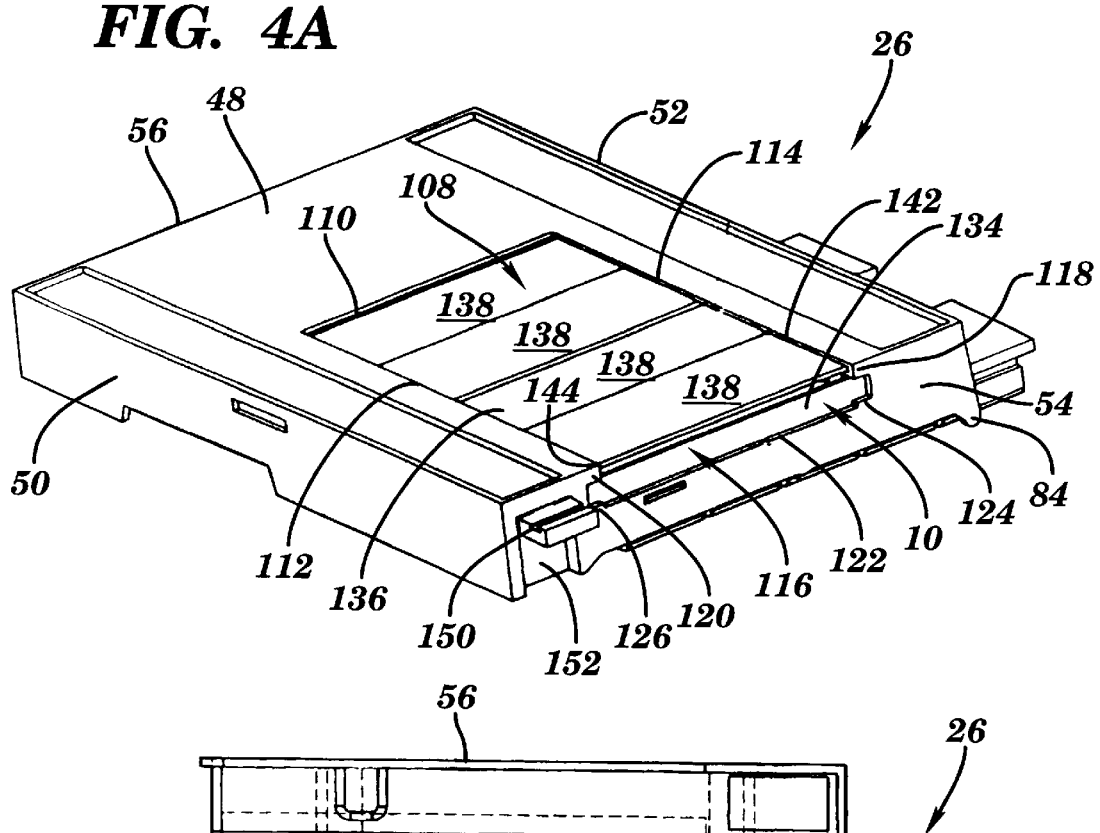
FIG. 4A is a perspective view of the open-surfaced receptacle with shutters in the closed position, also showing the door.
Figure 4B:
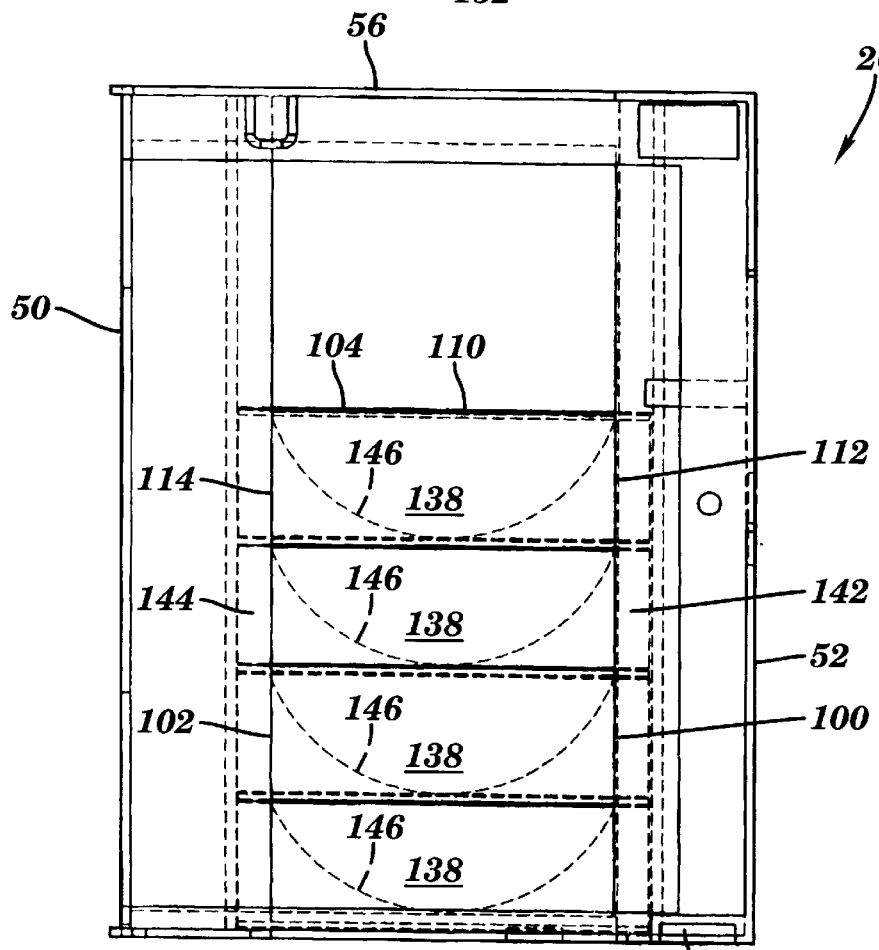
FIG. 4B is a top view of the receptacle with the shutters in a closed position.

Ejector assemblies for receptacle 10 or slots are well known to those skilled in the art and thus will not be described in detail here. However, the ejector assembly does includes an ejector button 150 which extends out from the front surface 54 of the right section 26 and is pivotally connected to the platform 14 as shown in FIGS. 3A and 4A.

The button 150 may be pivoted to rest adjacent to and in a groove 152 formed in the front surface 54 of the right section 26 or to extend out at about a ninety degree angle from front surface 54. Although one type of ejector button 150 is illustrated, it will be readily apparent to those skilled in the art that other types of ejector buttons could also be used as needed or desired. Various types of ejector mechanisms, both integrated into the housing and integrated into the card connector are commonly used in personal computers and other portable electronic devices incorporating removable cards. Note that the ejector is optional in applications where the card 18 protrudes beyond the front edge of the housing 54 when it is fully inserted. The ejector is required to remove cards that do not protrude beyond the edge 54 and do not displace the shutter 138.

The operation of the open-surfaced receptacle 10 in the personal computer 12 will be described with reference to FIGS. 1A, 1B, 3A, 3C and 4A. When an electronic card 18 is inserted in to the opening 116 in the front surface 54 of the right section 26, the door 134 in front of the opening 116 is pivoted to an open position. The side edges 128 and 130 of the electronic card 18 ride on the tracks 124 and 126 on the side walls 100 and 102 of the receptacle 10. When the electronic card 18 is fully inserted, the electrical connector 132 on the back of the electronic card 18 mates with the electronic connector 132 on the back wall 104 the receptacle 10 coupling the card 18 to the circuitry 16 in the platform 14.

The opening 108 in the bottom surface 48 of the right section 26 is designed to accommodate electronic cards 18 which have a height or thickness greater than the height or thickness of the side walls 100 and 102 of the receptacle 10. If such an electronic card 18 is inserted, the back edge of the electronic card 18 will press against the front edge of the first plate 138 of the shutter 136. As the electronic card 18 is inserted, the plates 138 of shutter 136 collapse onto each other moving the shutter 136 to an open position and permitting the electronic card 18 to protrude above the bottom surface 48 of the right section 26. As a result, the personal computer 12 is able to accept even the largest size electronic card 18, without sacrificing the additional space normally required to receive such a large electronic card 18.

By way of example, to accept a Type III card of 10.5 mm thickness 18 a prior receptacle 10 or slot would need an internal height or depth of about 10.5 mm for the upper and lower walls of the receptacle 10. If this receptacle 10 or slot is incorporated into a personal computer 12, the personal computer 12 would have to a have a height or depth of at least 10.5 mm for the opening plus wall thicknesses and the height of other components to accommodate the card 18 in receptacle 10 or such a slot. With the present invention, the overall height or depth measured between the upper and lower walls 100 and 102 of the open-surfaced receptacle 10 do not need to be as large as the height or depth of the card 18 and can, by way of example, range between about 3.3 mm to 5.5 mm, depending upon whether the requirement were to fully enclose a Type I card of 3.3 mm thickness, or a Type II card of 5.5 mm thickness. As a result, the height or depth (thickness) of any personal computer 12, or other electronic device which incorporated a receptacle 10 in accordance with the present invention, is smaller than a personal computer which incorporated a prior receptacle or slot without such an open surface.

To eject the card, the ejector button 150 is pivoted to a position which is substantially perpendicular to the front surface 54 of the right section 26 and then the button 150 is pressed in. In a manner, well known to those skilled in the art, the electronic card 18 is ejected by a biasing device in the receptacle 10. As the electronic card 18 is ejected, the shutter 136 is biased to a position covering the opening 108 by leaf springs 146 and the door 134 is pivoted to close the opening 108.

Figure 6A:
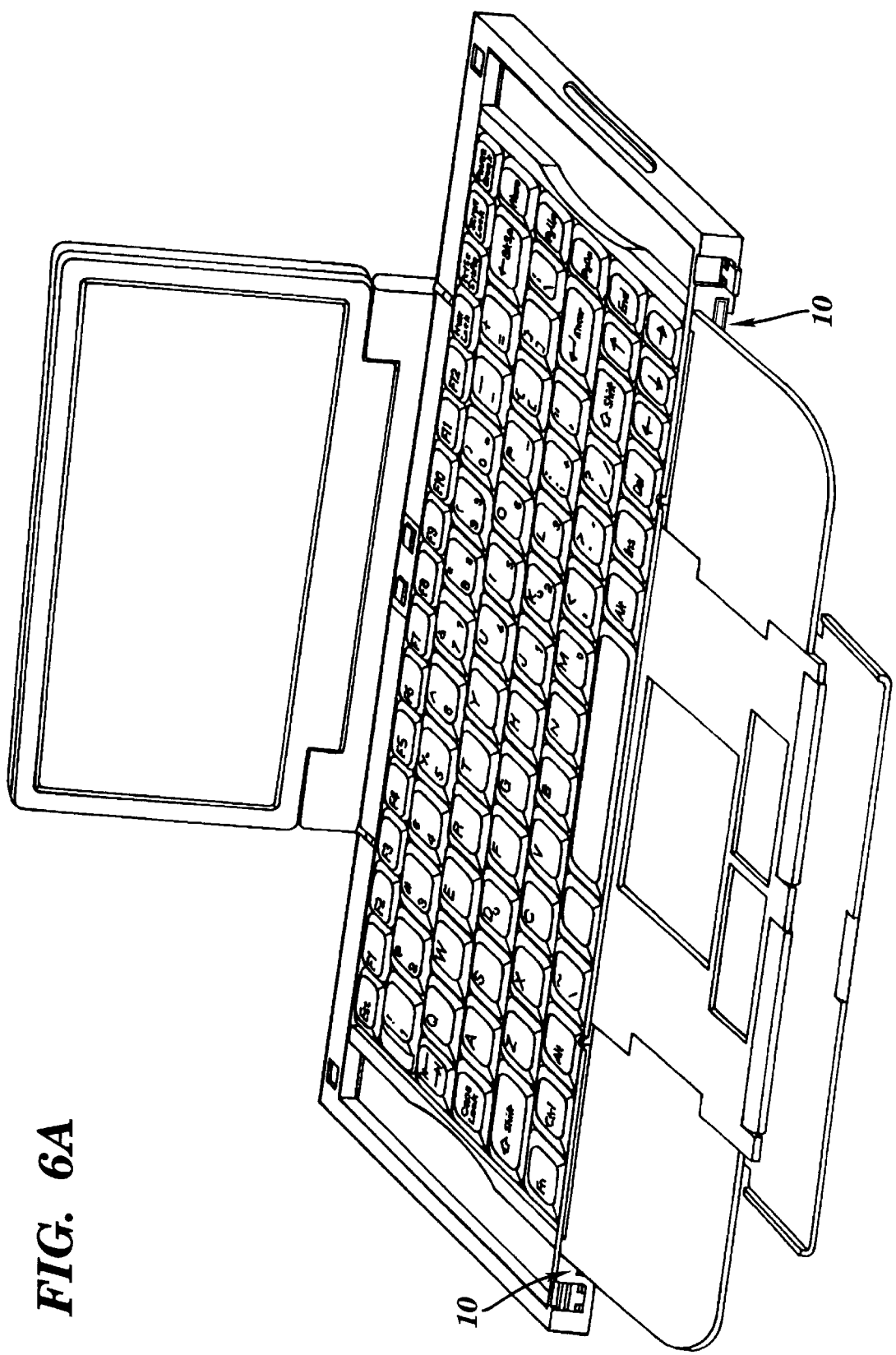
FIG. 6A is a perspective view of the open-surfaced receptacle in accordance with the present invention in a sub-notebook computer.
Figure 6B:
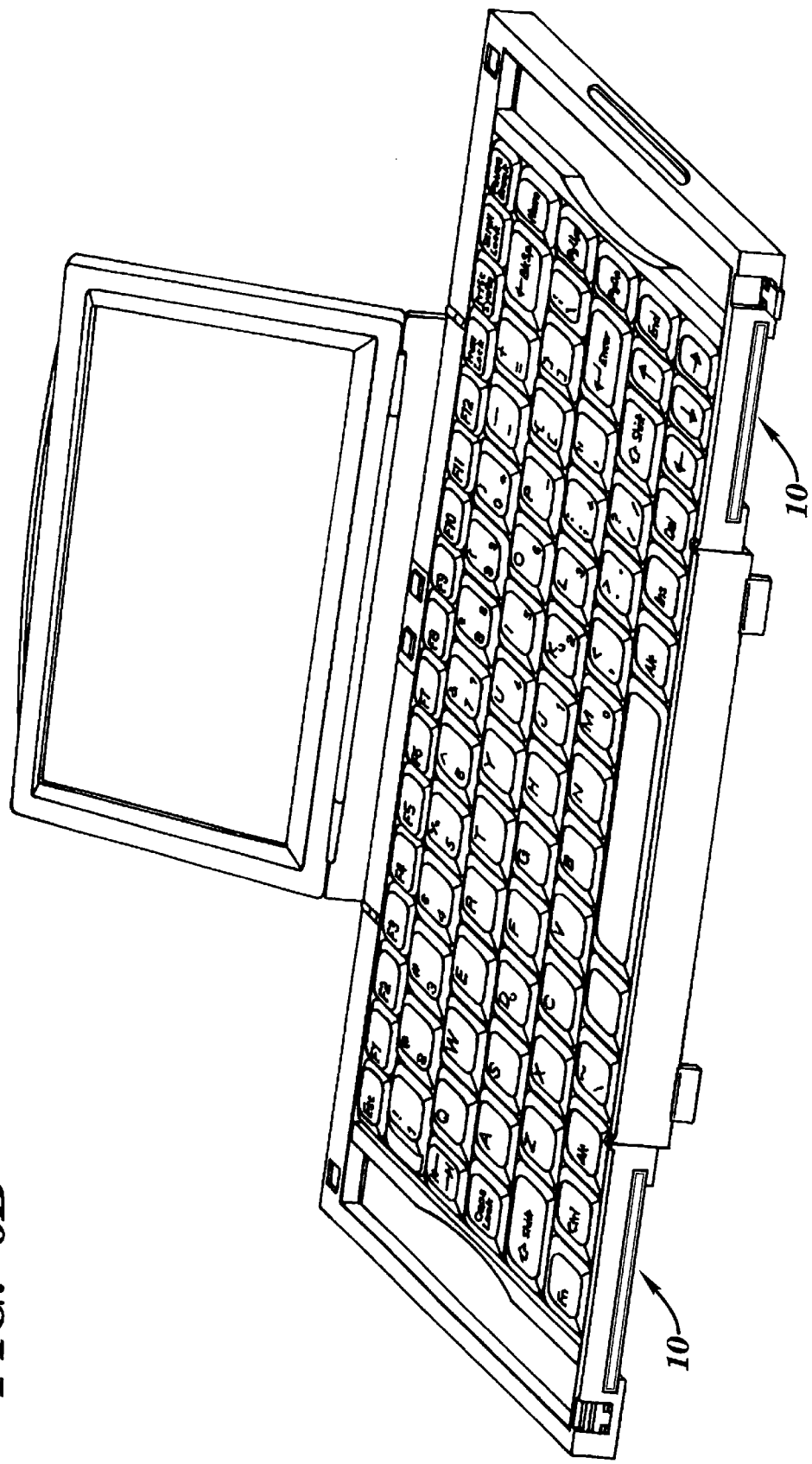
FIG. 6B is a perspective view of the open-surfaced receptacle in accordance with the present invention in a palmtop computer or digital organizer.

Referring to FIGS. 6A and 6B, alternative embodiments of the open surfaced receptacle in a sub-notebook computer and in a palmtop computer or digital organizer are illustrated. As noted earlier, the open surfaced receptacle may also be used in other applications, including mobile phones, personal digital assistant and many other applications that desire to minimize the enclosed volume for storage or transport while retaining the ability to operate these removable modules.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. An electronic product comprising:

a platform including at least two surfaces and at least one side, the platform comprising a central keyboard section and at least one additional keyboard section pivotally connected to the central keyboard section, the central keyboard section and the additional keyboard section each having a plurality of keys along one of the surfaces;

circuitry connected to the platform; and a receptacle for receiving an electronic card or module having a length, a width, and a depth, the receptacle extending in from the side of the platform and defining an opening in another one of the surfaces which extends into the platform along substantially the length and width of the receptacle, the receptacle being located in the additional keyboard section along another one of the surfaces.

2. The electronic product as set forth in claim 1 further comprising an electrical connector in the receptacle which is coupled to the circuitry, wherein the electrical connector remains coupled to the circuits when the additional keyboard section is in an open position or a closed position.

3. The electronic product as set forth in claim 1 wherein the platform comprises another additional keyboard section pivotally connected to the central keyboard section, another receptacle located in the another additional keyboard section.

4. The electronic product as set forth in claim 1 further comprising an ejector button connected to the platform.

5. The electronic product as set forth in claim 4 wherein the ejector button is pivotally connected to the platform and is pivotable to a position resting adjacent to the side of the platform.

6. The electronic product as set forth in claim 1 wherein the receptacle comprises:

a pair of opposing side walls connected to the another one of the surfaces, along opposing sides of the opening, extending into the platform, and extending to the opening in the side of the platform;

a back wall connected to the another one of the surfaces, adjacent to and extending in to the opening, and connected to the opposing side walls; and an electrical connector connected to back wall and coupled to the circuitry.

7. An electronic product comprising:

a platform including at least one surface and at least one side;

circuitry connected to the platform;

a receptacle for receiving an electronic card or module having a length, a width, and a depth, the receptacle extending in from the side of the platform and defining an opening in the surface which extends into the platform along substantially the length and width of the receptacle;

a shutter moveable between a position covering the opening in the surface and a position exposing the opening in the surface; and a door moveable between a position covering the opening in the side of the platform and a position exposing the opening in the side of the platform.

8. The electronic product as set forth in claim 7 wherein the shutter comprises a series of two or more detachably interlocking plates, each of the plates having a J-shaped end which detachably interlocks with the J-shaped end of another one of the plates.

9. The electronic product as set forth in claim 7 further comprising a biasing assembly connected to the shutter, the biasing assembly biasing the shutter to the position covering the opening in the surface of the platform.

10. A personal computer comprising:

a display a platform including at least two surfaces and at least one side, the platform comprising a central keyboard section and at least one additional keyboard section pivotally connected to the central keyboard section, the central keyboard section and the additional keyboard section each having a plurality of keys along one of the surfaces;

circuitry connected to the platform, the display coupled to the circuitry and the platform;

a receptacle having a length, a width and a height extending into the platform from the side and defines an opening in another one of the surfaces which extends into the platform along substantially the length and width of the receptacle, the receptacle being located in the additional keyboard section along the another one of the surfaces; and an electrical connector located in the receptacle and coupled to the circuitry.

11. The personal computer as set forth in claim 10 wherein the electrical connector remains coupled to the circuitry when the additional keyboard section is in an open position or a closed position.

12. The personal computer as set forth in claim 10 wherein the platform comprises another additional keyboard section pivotally connected to the central keyboard section another receptacle located in the another additional keyboard section.

13. The personal computer as set forth in claim 10 further comprising an ejector button connected to the platform.

14. The personal computer as set forth in claim 13 wherein the ejector button is pivotally connected to the platform and is pivotable to a position resting adjacent to the side of the platform.

15. The personal computer as set forth in claim 10 wherein the receptacle comprises:

a pair or opposing side walls connected to the another one of the surfaces, along opposing sides of the opening, extending into the platform, and extending to the opening in the side of the platform; and a back wall connected to the another one of the surfaces, adjacent to the extending in to the opening, and connected to the opposing side walls, the electrical connector connected to the back wall.

16. A personal computer comprising:

a display;

a platform including at least two opposing surfaces and at least one side;

circuitry connected to the platform, the display coupled to the circuitry;

a keyboard connected to one of the opposing surfaces and coupled to the circuitry;

a receptacle having a length, a width and a height extending into the platform from the side and defines an opening in another one of the opposing surfaces which extends into the platform alone substantially the length and width of the receptacle; and an electrical connector located in the receptacle and coupled to the circuitry;

a shutter moveable between a position covering the opening in the another one of the opposing surfaces and a position exposing, the opening in the another one of the opposing surfaces; and a door moveable between a position covering the opening in the side of the platform and a position exposing the opening in the side of the platform.

17. The personal computer as set forth in claim 16 wherein the shutter comprises a series of two or more detachably interlocking plates, each of the plates having a J-shaped end which detachably interlocks with the J-shaped end of another one of the plates.

18. The personal computer as set forth in claim 16 further comprising a biasing assembly connected to the shutter, the biasing assembly biasing the shutter to the position covering the opening in the another one of the opposing surfaces of the platform.

\* \* \* \* \*